(12) United States Patent
Sanzari et al.

(10) Patent No.: US 12,529,322 B1
(45) Date of Patent: Jan. 20, 2026

(54) GAS TURBINE ENGINE STATOR VANE STAGE

(71) Applicant: Pratt & Whitney Canada Corp., Longueuil (CA)

(72) Inventors: Lorenzo Sanzari, Montreal (CA); Franco Di Paola, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/941,701

(22) Filed: Nov. 8, 2024

(51) Int. Cl.
*F01D 9/04* (2006.01)
*F01D 11/00* (2006.01)

(52) U.S. Cl.
CPC ............ *F01D 9/041* (2013.01); *F01D 11/005* (2013.01); *F05D 2240/10* (2013.01); *F05D 2260/30* (2013.01)

(58) Field of Classification Search
CPC .... F01D 9/041; F01D 11/005; F05D 2240/10; F05D 2260/30
See application file for complete search history.

(56) References Cited

U.S. PATENT DOCUMENTS

| | | | | |
|---|---|---|---|---|
| 4,986,737 A | * | 1/1991 | Erdmann | F01D 5/22 416/190 |
| 5,868,553 A | | 2/1999 | Battig | |
| 6,139,263 A | * | 10/2000 | Klingels | F01D 5/225 415/173.5 |
| 7,513,102 B2 | * | 4/2009 | Moniz | F02K 3/072 60/268 |
| 8,753,078 B2 | | 6/2014 | Speed | |
| 9,677,427 B2 | | 6/2017 | Synnott | |
| 9,771,828 B2 | | 9/2017 | Karafillis | |
| 9,816,386 B2 | | 11/2017 | Feldmann | |
| 9,835,038 B2 | * | 12/2017 | Paradis | F01D 9/042 |
| 10,392,951 B2 | | 8/2019 | Carr | |
| 10,641,118 B2 | | 5/2020 | Ikeda | |
| 11,156,109 B2 | * | 10/2021 | Depalma | F01D 5/3038 |
| 11,156,115 B2 | | 10/2021 | Feldmann | |
| 11,549,379 B2 | * | 1/2023 | Usseglio | F01D 5/06 |
| 11,732,609 B2 | | 8/2023 | Menheere | |
| 2015/0125289 A1 | * | 5/2015 | Maltaverne | F01D 9/041 29/889.22 |

(Continued)

FOREIGN PATENT DOCUMENTS

DE 3336420 A1 * 4/1984

*Primary Examiner* — Brian Christopher Delrue
(74) *Attorney, Agent, or Firm* — Getz Balich LLC

(57) ABSTRACT

A gas turbine engine is provided that includes a compressor section, a combustion section, and a turbine section. The turbine section has a rotor stage disposed adjacent an annular stator vane stage. The annular stator vane stage includes an annular inner and outer radial shrouds, stator vanes, and a retaining ring. The stator vanes are circumferentially spaced apart from one another, extending between the shrouds. The inner radial shroud is mechanically engaged with a first engine support structure at a first position axially forward of the plurality of stator vanes, and the outer radial shroud is mechanically engaged with a second engine support structure at a second position axially forward of the plurality of stator vanes. The annular stator vane stage includes a flange extending outward from the outer radial shroud that is contiguous with the retaining ring.

20 Claims, 4 Drawing Sheets

(56) References Cited

U.S. PATENT DOCUMENTS

2015/0354410 A1* 12/2015 Budnick ............... F01D 25/246
                                                                                    415/177
2019/0093489 A1* 3/2019 Mondal .................... F01D 5/06

* cited by examiner

GAS TURBINE ENGINE STATOR VANE STAGE

BACKGROUND OF THE INVENTION

1. Technical Field

The present disclosure relates gas turbine engines in general and to gas turbine engine stator vane stages in particular.

2. Background Information

Turbine vanes or stators are stationary airfoils positioned within the engine's turbine section, situated between stages of turbine blades. The stator vanes typically precede the rotor blades and are configured to direct the flow of combustion-generated hot gases. In some instances, a stator vane stage may include a plurality of stator vanes that extend between an inner annular member referred to as an inner shroud and an outer annular member referred to as an outer shroud. Typically, the outer shroud features both axial and radial retention mechanisms that secure it to a surrounding structure. Stator vanes, especially those closest to the combustion section of the engine, are subjected to intense heat from the core gas flow passing through the stator vane stage. These stator vanes are often subject to significant thermal stresses as they are constrained by the relatively cooler inner and outer shrouds. The high-temperature stator vanes are restricted in their ability to expand or grow due to the surrounding cooler inner and outer shrouds. What is needed is a turbine stator vane stage with an improved ability to accommodate thermal growth and thereby mitigate thermal stresses.

SUMMARY

According to an aspect of the present disclosure, a gas turbine engine is provided that includes a compressor section, a combustion section, and a turbine section. The turbine section is disposed aft of the combustion section and has a rotor stage disposed adjacent an annular stator vane stage. The annular stator vane stage includes an annular inner radial shroud, an annular outer radial shroud, a plurality of stator vanes, and a retaining ring. The plurality of stator vanes are circumferentially spaced apart from one another, extending between the inner and outer radial shrouds. The inner radial shroud is mechanically engaged with a first engine support structure at a first position axially forward of the plurality of stator vanes, and the outer radial shroud is mechanically engaged with a second engine support structure at a second position axially forward of the plurality of stator vanes. The annular stator vane stage further includes a flange extending radially outward from the outer radial shroud, and the flange is contiguous with the retaining ring in a manner that permits radial movement of the flange relative to the retaining ring.

In any of the aspects or embodiments described above and herein, the flange may include an aft seal surface that extends radially.

In any of the aspects or embodiments described above and herein, the retaining ring may include a forward seal surface, and the aft seal surface of the flange is contiguous with the forward seal surface, and forms a seal therebetween.

In any of the aspects or embodiments described above and herein, the forward seal surface and the aft seal surface each may have a surface configuration that facilitates a sliding contact therebetween.

In any of the aspects or embodiments described above and herein, the forward seal surface and the aft seal surface may be parallel one another.

In any of the aspects or embodiments described above and herein, the retaining ring may include an inner radial segment, an outer radial segment, and a connecting segment extending between the inner radial segment and the outer radial segment, and the inner radial segment may include the forward seal surface.

In any of the aspects or embodiments described above and herein, the connecting segment may extend linearly between the inner radial segment and the outer radial segment.

In any of the aspects or embodiments described above and herein, the turbine section may be centered on an engine axial centerline, and the connecting segment may be disposed at an acute angle relative to the engine axial centerline.

In any of the aspects or embodiments described above and herein, the retaining ring may be a casting.

In any of the aspects or embodiments described above and herein, the annular stator vane stage may include a plurality of first lugs extending radially outward from the outer radial shroud at the second position axially forward of the plurality of stator vanes. The first lugs may be circumferentially spaced apart from one another, and may be mechanically engaged with the second engine support structure.

In any of the aspects or embodiments described above and herein, the first lugs may be mechanically engaged with first mating features of the second engine support structure, and the first lugs and the first mating features may be configured to allow radial growth of the stator vane stage.

In any of the aspects or embodiments described above and herein, the outer radial shroud may include a first aft portion that extends away from the plurality of stator vanes and the first aft portion of the outer radial shroud may be cantilevered.

In any of the aspects or embodiments described above and herein, the inner radial shroud may include a second aft portion that extends away from the plurality of stator vanes and the second aft portion of the inner radial shroud may be cantilevered.

In any of the aspects or embodiments described above and herein, the retaining ring may include an inner radial segment, an outer radial segment, and a connecting segment extending between the inner radial segment and the outer radial segment. The retaining ring may include a plurality of second lugs extending radially outward from the outer radial segment. The second lugs may be circumferentially spaced apart from one another, and may be mechanically engaged with the second engine support structure.

In any of the aspects or embodiments described above and herein, the annular stator vane stage may be a unitary annular construct.

In any of the aspects or embodiments described above and herein, the annular inner radial shroud may be configured as a first continuous ring, and the annular outer radial shroud may be configured as a second continuous ring.

According to an aspect of the present disclosure, an annular stator vane stage is provided that includes an annular inner radial shroud, an annular outer radial shroud, and a plurality of stator vanes. The plurality of stator vanes are circumferentially spaced apart from one another and extend between the inner radial shroud and the outer radial shroud. The inner radial shroud includes an attachment flange disposed at a first position axially forward of the plurality of stator vanes, and the outer radial shroud includes a plurality of lugs extending radially outward from the outer radial shroud at a second position axially forward of the plurality of stator vanes. The annular stator vane stage includes a flange extending radially outward from the outer radial shroud. The flange includes an aft seal surface that extends radially and has a surface configuration that facilitates a sliding contact therebetween.

In any of the aspects or embodiments described above and herein, the annular stator vane stage may be configured to be mounted at the attachment flange disposed at the first position axially forward of the plurality of stator vanes, and at the plurality of lugs disposed at the second position axially forward of the plurality of stator vanes, and cantilevered aft of the first position and the second position.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
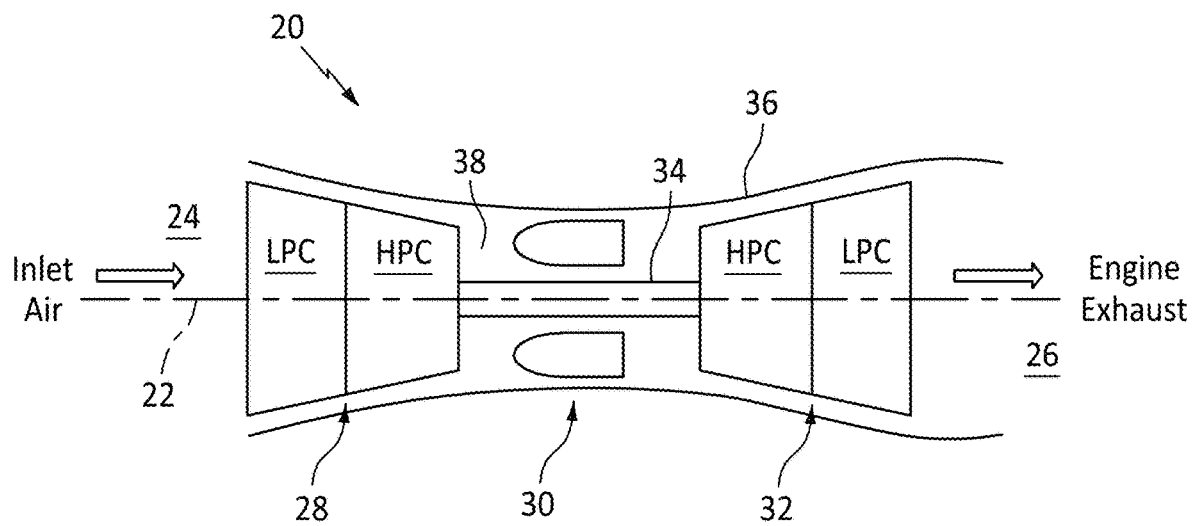
FIG. 1 is a diagrammatic view of a gas turbine engine embodiment.

FIG. 1 shows a diagrammatic view of a gas turbine engine 20. The gas turbine engine 20 extends along an axial centerline 22 between an upstream airflow inlet 24 and a downstream airflow exhaust 26. The gas turbine engine 20 includes a compressor section 28, a combustion section 30, and a turbine section 32. In some embodiments, the compressor section 28 may include a low pressure compressor (LPC) and a high pressure compressor (HPC), but having both a LPC and an HPC is not required. In some embodiments, the compressor section 28 may be configured as an axial compressor. In some embodiments, the compressor section 28 may be configured as a centrifugal compressor. The turbine section 32 may include a high pressure turbine (HPT) and a low pressure turbine (LPT), but having both a HPT and an LPT is not required. In some embodiments, the gas turbine engine 20 may include a power turbine. The compressor section 28 is driven by the turbine section 32 by one or more shafts 34 (sometimes referred to as "spools") extending therebetween. The gas turbine engine 20 diagrammatically shown in FIG. 1 has an axial flow configuration; e.g., the engine sections 28, 30, 32 are arranged sequentially along the centerline 22 within an engine case 36. Air enters the compressor section 28 and is worked to a higher pressure and temperature. The compressed air passes into the combustion section 30 where it is mixed with fuel and is combusted. The combustion products and any unburnt air pass into the turbine section 32 before exiting the engine 20 through the engine exhaust, which may be in the form of a nozzle. The path of the air and combustion products through the engine 20 (i.e., through the compressor section 28, from the compressor section 28 and into the combustion section 30, and from the combustion section 30 and into the turbine section 32) may be referred to as the core gas path 38. The terms "forward", "leading", "aft, "trailing" are used herein to indicate the relative position of a component or surface. The terms "forward" and "aft" typically follow the direction of the air/core gas flow through the engine 20; i.e., forward to aft. In an axial flow engine 20 like that shown diagrammatically in FIG. 1, the engine sections 28, 30, 32 are also disposed forward to aft between the engine air inlet 24 and the engine exhaust 26; i.e., the compressor section 28 is disposed forward of the combustion section 30, and the turbine section 32 is aft of the combustion section 30. The terms "inner radial" and "outer radial" refer to relative radial positions from the engine centerline 22. An inner radial component or path is disposed radially closer to the engine centerline 22 than an outer radial component or path.

The diagrammatic representation of a gas turbine engine 20 shown in FIG. 1 is provided herewith to illustrate the various sections within a gas turbine engine 20. The present disclosure is not limited to axial flow gas turbine engines, and/or may be used with a reverse flow gas turbine engine, and/or may be used with gas turbine engines having a geared configuration that permits a propeller or a rotor to operate at a different rotational speed that the gas turbine engine, and/or single or multi-spool engines, and the like. Hence, the present disclosure may be used with a variety of different gas turbine engine configurations.

Figure 2:
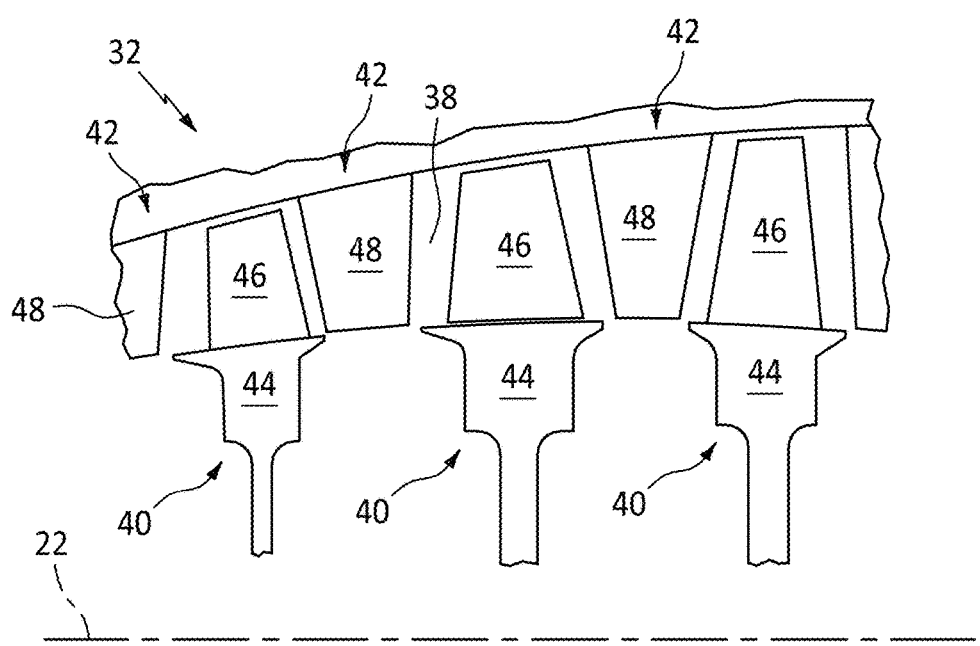
FIG. 2 is a partial diagrammatic view of a turbine section of a gas turbine engine.

FIG. 2 diagrammatically illustrates a turbine section 32 having a plurality of rotor stages 40 and stator vane stages 42. Each rotor stage 40 includes a disk 44 rotatable about the axial centerline 22 of the engine 20, with a plurality of rotor blades 46 that extend radially out from the disk 44 and into the core gas path 38. Each stator vane stage 42 includes a plurality of stator vanes 48 that extend radially across the core gas path 38 and are circumferentially spaced apart from one another around the engine axial centerline 22. The turbine section 32 shown in FIG. 2 is provided herewith to diagrammatically illustrate an arrangement of rotor stages 40 and stator vane stage 42 within a turbine section 32. The present disclosure is not limited to any turbine section 32 configuration other than as described herein.

Figure 3:
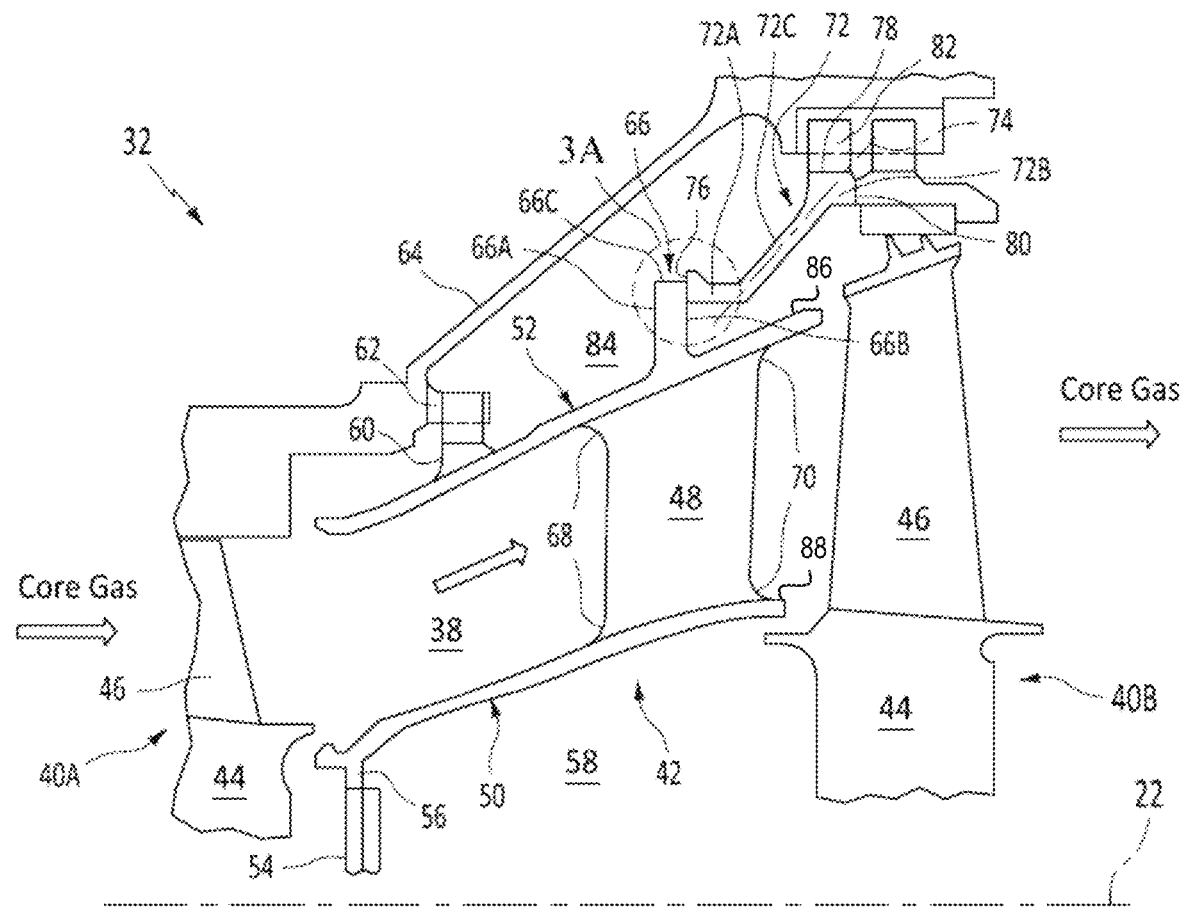
FIG. 3 is a partial diagrammatic view of a turbine section of a gas turbine engine, illustrating an embodiment of the present disclosure.

Referring to FIG. 3, a turbine section 32 is partially shown that includes a forward rotor stage 40A, a stator vane stage 42, and an aft rotor stage 40B. The forward rotor stage 40A includes a plurality of rotor blades 46 extending radially out from a disk 44. The aft rotor stage 40B includes a plurality of rotor blades 46 extending radially out from a disk 44. The stator vane stage 42 is an annular structure that includes a plurality of vanes 48, an inner shroud 50 (also referred to as "inner radial shroud"), and an outer shroud 52 (also referred to as "outer radial shroud"). The vanes 48 are spaced apart from one another around the circumference of the stator vane stage 42. The stator vanes 48 extend radially between the inner and outer shrouds 50, 52.

The annular stator vane stage 42 may be configured as a unitary construct with circumferentially continuous inner and outer shrouds 50; i.e., the annular stator vane stage is formed as a continuous ring. The inner shroud 50 forms the inner radial boundary of the core gas path 38 through that portion of the turbine section 32, and the outer shroud 52 forms the outer radial boundary of the core gas path 38 through that portion of the turbine section 32. The inner shroud 50 may be attached to engine inner radial support structure 54 to secure the stator vane stage 42. For example, the inner shroud 50 may include an attachment flange 56 that extends radially inward from the inner shroud 50. In the diagrammatic example shown in FIG. 3, the forward end of the inner shroud 50 is attached via the attachment flange 56 to inner radial support structure 54. A cavity 58 is formed radially inside of the inner shroud 50 between the forward rotor stage 40A and the aft rotor stage 40B.

Figure 4:
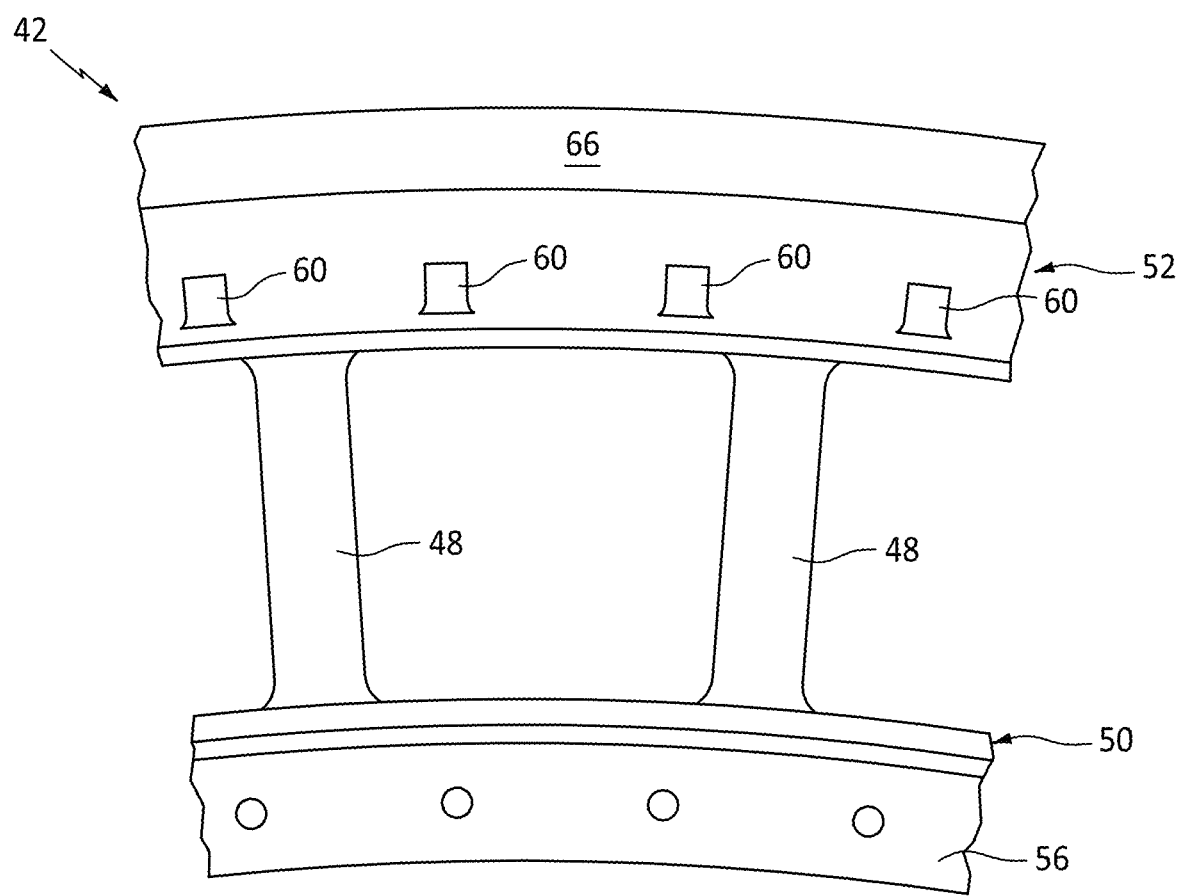
FIG. 4 is a partial diagrammatic view of a present disclosure stator vane stage embodiment in a direction from forward to aft.

Referring to FIGS. 3 and 4, a series of lugs 60 extend radially outward from the outer shroud 52. The lugs 60 are disposed forward of the vanes 48. The lugs 60 are configured to engage with mating features 62 disposed within an outer casing 64 (or other support structure) of the engine 20. The lugs 60 and the mating features 62 are configured to allow radial growth of the stator vane stage 42 and to circumferentially locate the stator vane stage 42. A flange 66 extends radially outward from the outer shroud 52. The flange 66 may be disposed radially outside of the vanes 48. For example, the flange 66 may be disposed radially outside of the vanes 48 at a central position between the leading edge of the vane 48 and the trailing edge of the vane 48 to mitigate stresses that may occur in the vane leading edge fillets 68 and/or the trailing edge fillets 70. The flange 66 includes a forward surface 66A, an aft surface 66B, and an end surface 66C. In the embodiment shown in FIG. 3, the forward and aft surfaces 66A, 66B are substantially parallel one another, and the end surface 66C extends between the forward and aft surfaces 66A, 66B. The present disclosure is not limited to this flange 66 configuration. The flange 66 may extend around the entire circumference of the stator vane stage 42. As will be described herein, the aft surface 66B may be configured to facilitate surface to surface movement and to act as a sealing surface; e.g., a portion or all of the flange aft surface 66B may be configured with a smooth surface finish and with a predetermined degree of flatness and parallelism relative to a forward seal surface of a retaining ring (described below).

Figure 3A:
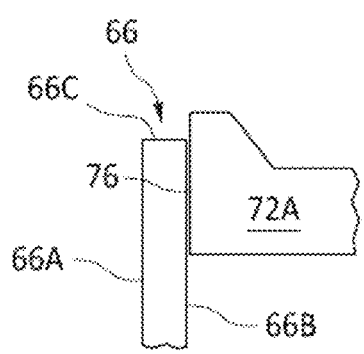
FIG. 3A is an enlarged view of a flange and retaining ring portion of the present disclosure embodiment shown in FIG. 3.
Figure 3B:
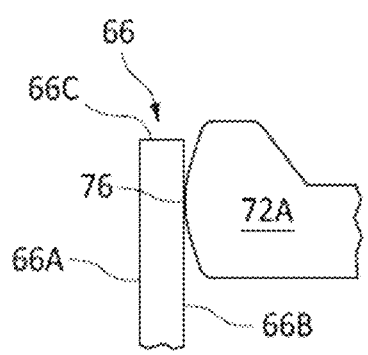
FIG. 3B is an enlarged view of an alternate embodiment of the flange and retaining ring portion of the present disclosure embodiment shown in FIG. 3A.
Figure 5:
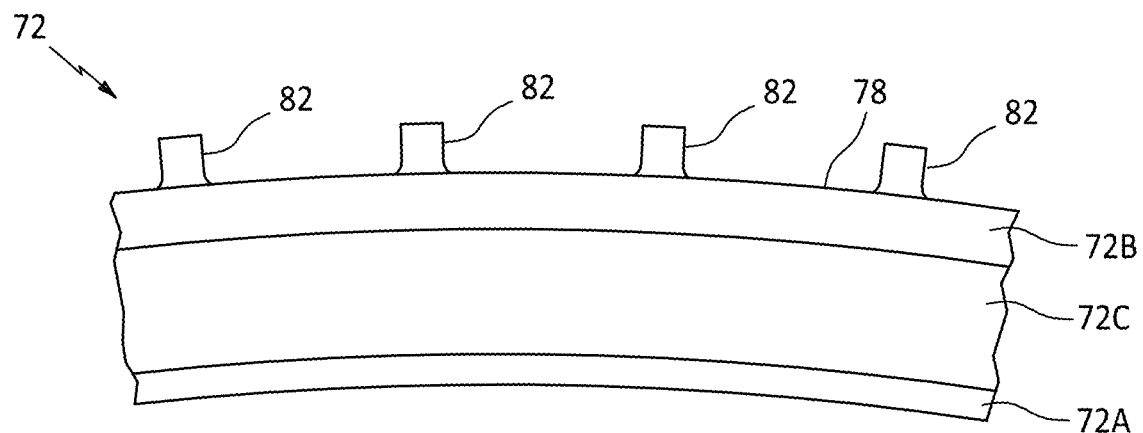
FIG. 5 is a partial diagrammatic view of a present disclosure retaining ring embodiment in a direction from forward to aft.

Referring to FIGS. 3 and 5, the turbine section 32 further includes a retaining ring 72 having an inner radial segment 72A, an outer radial segment 72B, and a connecting segment 72C extending between the inner and outer radial segments 72A, 72B. In the embodiment shown in FIGS. 3 and 5, the connecting segment 72C extends linearly (along line 74) between the inner radial segment 72A and the outer radial segment 72B. The present disclosure is not limited, however, to a retaining ring 72 configuration wherein the connecting segment 72C extends linearly between the inner radial segment 72A and the outer radial segment 72B; e.g., the connecting segment 72C may be arcuately shaped, or include arcuate portions. The connecting segment 72C is disposed at an acute angle relative to the engine centerline 22, having an axial component and a radial component. The inner radial segment 72A includes a forward seal surface 76 configured to form a seal with the aft surface 66B of the flange 66 extending radially outward from the outer shroud 52. Like the flange aft surface 66B, the forward seal surface 76 may be configured to facilitate surface to surface movement (e.g., sliding contact) and to act as a sealing surface; e.g., the forward seal surface 76 may be configured with a smooth surface finish and with a predetermined degree of flatness and parallelism relative to the flange aft seal. In some embodiments, the forward seal surface 76 of the inner radial member and the aft surface 66B of the flange 66 are both planar surfaces that are parallel one another (e.g., see FIG. 3A) to facilitate relative movement. In some embodiments, the forward seal surface 76 of the inner radial member and the aft surface 66B of the flange 66 may be configured to allow for some amount of misalignment therebetween; e.g., misalignment that may occur as a result of the disparate thermal growth between components. For example, the aft surface 66B of the flange 66 may have a planar configuration and the forward seal surface 76 of the inner radial member may have an arcuate configuration (e.g., see FIG. 3B). The outer radial segment 72B includes an outer radial surface 78, an aft seal surface 80, and a plurality of lugs 82 extending out from the outer radial surface 78. The lugs 82 are circumferentially spaced apart from one another and are configured to engage with mating features disposed within the outer casing 64 (or other support structure) of the engine 20. The lugs 82 and the outer casing mating features are configured to circumferentially locate the retaining ring 72 and may be configured to allow radial growth of the retaining ring 72. A cavity 84 is formed radially outside of the stator vane stage 42, which cavity 84 is defined by the outer shroud 52 of the stator vane stage 42, the retaining ring 72, and the outer casing 64 (or other support structure).

The retaining ring 72 may be manufactured using different manufacturing techniques and materials. As an example, the retaining ring 72 may be manufactured in a forging process. As another example, the retaining ring 72 may be manufactured from a casting. In some applications, a casting may be produced that is less thick (e.g., in the connecting segment 72C) than is possible using a forging process. In addition, some cast materials possess improved elevated temperature mechanical properties. Furthermore, some cast materials may be less susceptible to creep than some forged materials, especially at the elevated temperatures within the gas turbine engine 20.

Figure 6:
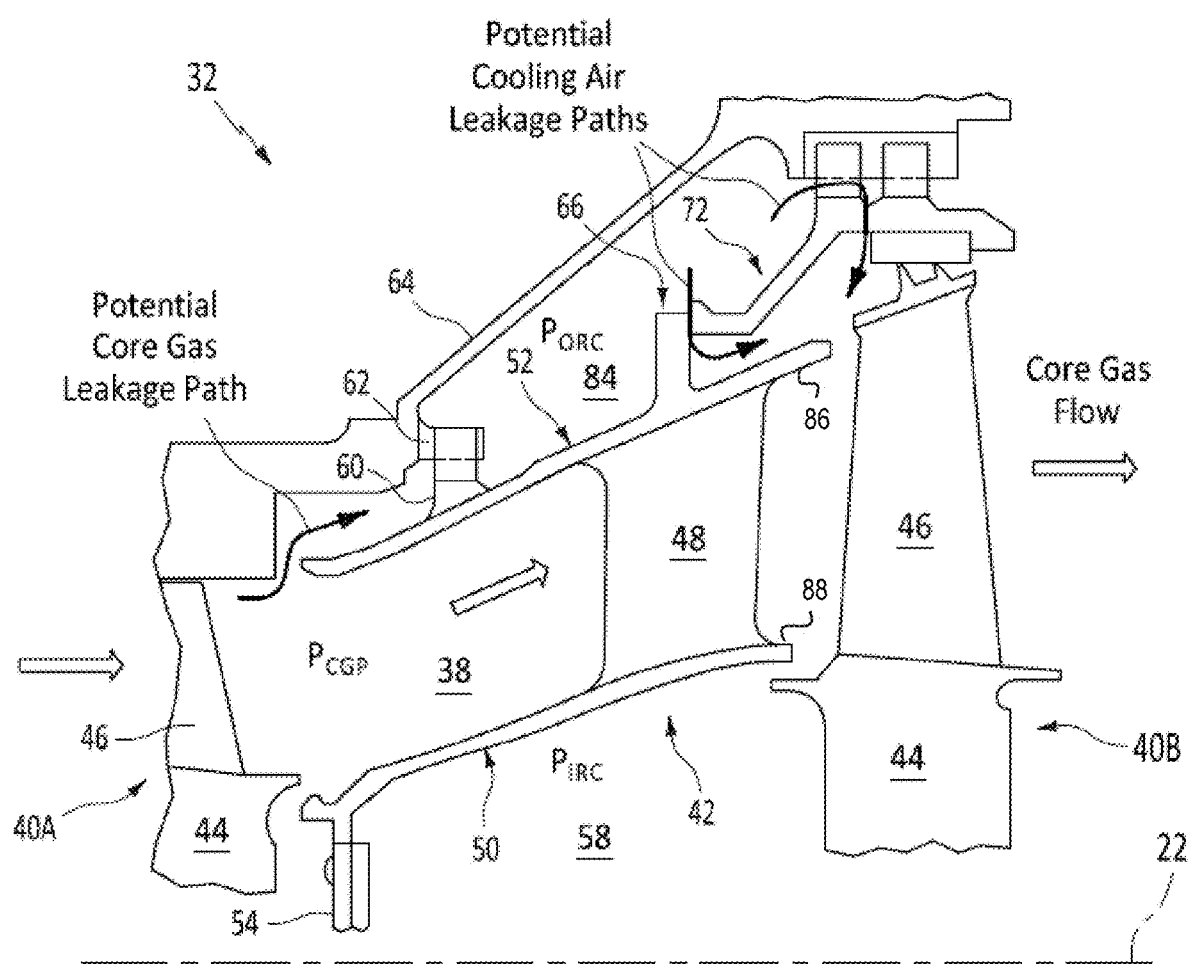
FIG. 6 is the diagrammatic view of a turbine section shown in FIG. 3, annotated to shown core gas flow and cooling air flow.

During operation of the gas turbine engine 20, the cavity 58 radially inside of the stator vane stage 42 and the cavity 84 radially outside of the stator vane stage 42 are supplied with cooling air; e.g., see FIG. 6. The cooling air within the cavity 58 disposed radially inside of the stator vane stage 42 may be described as being at an inner radial cavity pressure ("$P_{IRC}$"). The cooling air within the cavity 84 disposed radially outside of the stator vane stage 42 may be described as being at an outer radial cavity pressure ("$P_{ORC}$"). Core gas passing through the core gas path 38 may be described as being at a core gas path pressure ("$P_{CGP}$"). Under normal operating conditions, the cooling air disposed within the inner radial cavity 58 ("$P_{IRC}$") and the cooling air disposed within the outer radial cavity 84 ("$P_{ORC}$") are at a higher pressure than the pressure ("$P_{CGP}$") of the core gas flow passing through the core gas path 38.

During operation of the gas turbine engine 20, the vanes 48 within the stator vane stage 42 are subject to core gas flow at a very high temperature; i.e., a temperature that is substantially higher than the cooling air within either the inner radial cavity 58 or the outer radial cavity 84. During an operational transient period (e.g., wherein the engine 20 is controlled to produce additional thrust), the core gas increases in temperature and causes the stator vane stage vanes 48 to experience a rapid thermal growth rate and this thermal growth rate can be higher than the growth rate of other components; e.g., components exposed to cooling air such as the inner and outer radial shrouds 50, 52, the outer casing 64, inner radial engine support structure 54 connected to the inner shroud 50, and the like. As a result of the thermal growth, sections of the vane 48 (e.g., typically the leading edge fillets 68 extending between the vane 48 and the respective shroud 50, 52 and the trailing edge fillets 70 extending between the vane 48 and the respective shroud 50, 52) can be subject to stress that can limit the useful life of the stator vane stage 42.

Regarding the outer radial cavity 84, cooling air leakage from the outer radial cavity 84 can cause a decrease in the pressure ("$P_{ORC}$") of the cooling air within the outer radial cavity 84. If the pressure ("$P_{ORC}$") of the cooling air within the outer radial cavity 84 decreases to the point where it is equal to or less than the pressure ("$P_{CGP}$") of the core gas flow passing through the core gas path 38, the high temperature core gas flow can pass into the outer radial cavity 84, thereby defeating the cooling performed by the cooling air in the outer radial cavity 84.

Embodiments of the present disclosure provide improved stator vane stage thermal growth accommodation. As detailed herein, the inner shroud 50 of the present disclosure stator vane stage 42 is positionally secured to the inner radial support structure 54 of the engine 20 forward of the vanes 48 and the outer shroud 52 of the present disclosure stator vane stage 42 is positionally secured to the outer casing 64 (or other support structure) via lugs 60 also forward of the vanes 48. A first aft portion 86 of the outer shroud 52 aft of the vanes 48 is not coupled to any support structure. A second aft portion 88 of the inner shroud 50 aft of the vanes 48 is not coupled to any support structure. Hence, the stator vane stage 42 may be described as being cantilevered from the connection point of the inner shroud 50 forward of the stator vanes 48, and from the connection point of the outer shroud 52 forward of the stator vanes 48. The forward seal surface 76 of the retaining ring inner radial segment 72A and the aft surface 66B of the flange 66 are contiguous with one another and allow for relative movement. For example, thermal growth of the vanes 48 will cause the flange 66 to move radially outward and relative to the forward seal surface 76 of the retaining ring 72. Despite this relative movement, the aft surface 66B of the flange 66 and the forward seal surface 76 of the retaining ring 72 are configured to maintain a seal therebetween. Maintaining an effective seal helps to mitigate cooling air leakage and the potential for hot core gas infiltration into the outer radial cavity 84.

The attachment configuration of the present disclosure stator vane stage 42 is also understood to mitigate undesirable stress within the vanes 48. As stated above, the inner shroud 50 and the outer shroud 52 are positionally secured to respective structure forward of the vanes 48. Disposing the attachment sites forward of the vanes 48 is understood to mitigate potential vane stress concentrations; e.g., potential stress concentrations in the vane leading edge fillets 68 and/or the trailing edge fillets 70.

The attachment configuration of the present disclosure stator vane stage 42 also decouples the stator vane stage 42 structure from structure associated with the aft rotor stage 40B; e.g., the retaining ring 72 is independent of any blade tip sealing structure associated with the aft rotor stage 40B.

The attachment configuration of the present disclosure stator vane stage 42 also facilitates assembly and disassembly of the turbine section 32. The components of the stator vane stage 42 may be assembled by inserting the components in a direction from aft to forward within the outer casing 64 without interference.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine, comprising;
a compressor section;
a combustion section; and
a turbine section disposed aft of the combustion section, the turbine section having a rotor stage disposed adjacent an annular stator vane stage;
wherein the annular stator vane stage includes an annular inner radial shroud, an annular outer radial shroud, a plurality of stator vanes, and a retaining ring, wherein the plurality of stator vanes are circumferentially spaced apart from one another and extending between inner radial shroud and the outer radial shroud; and
wherein the inner radial shroud is mechanically engaged with a first engine support structure at a first position axially forward of the plurality of stator vanes, and the outer radial shroud is mechanically engaged with a second engine support structure at a second position axially forward of the plurality of stator vanes; and
wherein the annular stator vane stage further includes a flange extending radially outward from the outer radial shroud at an axial position that is central between a leading edge and a trailing edge of the plurality of stator vanes, and the flange is contiguous with the retaining ring in a manner that permits radial movement of the flange relative to the retaining ring.

2. The gas turbine engine of claim 1, wherein the flange includes an aft seal surface that extends radially.

3. The gas turbine engine of claim 2, wherein the retaining ring includes a forward seal surface, and the aft seal surface of the flange is contiguous with the forward seal surface, and forms a seal therebetween.

4. The gas turbine engine of claim 3, wherein the forward seal surface and the aft seal surface each have a surface configuration that facilitates a sliding contact therebetween, wherein each of the forward seal surface and the aft seal surface has a predetermined degree of flatness and parallelism relative to the other.

5. The gas turbine engine of claim 4, wherein the forward seal surface and the aft seal surface are parallel one another.

6. The gas turbine engine of claim 4, wherein the retaining ring includes an inner radial segment, an outer radial segment, and a connecting segment extending between the inner radial segment and the outer radial segment, and wherein the inner radial segment includes the forward seal surface.

7. The gas turbine engine of claim 6, wherein the connecting segment extends linearly between the inner radial segment and the outer radial segment.

8. The gas turbine engine of claim 7, wherein the turbine section is centered on an engine axial centerline; and
wherein the connecting segment is disposed at an acute angle relative to the engine axial centerline.

9. The gas turbine engine of claim 8, wherein the retaining ring is a casting.

10. The gas turbine engine of claim 1, wherein the annular stator vane stage includes a plurality of first lugs extending radially outward from the outer radial shroud at the second position axially forward of the plurality of stator vanes, wherein the first lugs are circumferentially spaced apart from one another, and the first lugs are mechanically engaged with the second engine support structure.

11. The gas turbine engine of claim 10, wherein the first lugs are mechanically engaged with the second engine support structure to allow radial growth of the stator vane stage.

12. The gas turbine engine of claim 11, wherein the outer radial shroud includes a first aft portion that extends away from the plurality of stator vanes and the first aft portion of the outer radial shroud is cantilevered.

13. The gas turbine engine of claim 12, wherein the inner radial shroud includes a second aft portion that extends away from the plurality of stator vanes and the second aft portion of the inner radial shroud is cantilevered.

14. The gas turbine engine of claim 11, wherein the retaining ring includes an inner radial segment, an outer radial segment, and a connecting segment extending between the inner radial segment and the outer radial segment; and
wherein the retaining ring further includes a plurality of second lugs extending radially outward from the outer radial segment, wherein the second lugs are circumferentially spaced apart from one another, and the second lugs are mechanically engaged with the second engine support structure.

15. The gas turbine engine of claim 10, wherein the annular stator vane stage is a unitary annular construct.

16. The gas turbine engine of claim 10, wherein the annular inner radial shroud is configured as a first continuous ring, and the annular outer radial shroud is configured as a second continuous ring.

17. An annular stator vane stage, comprising;
an annular inner radial shroud;
an annular outer radial shroud; and
a plurality of stator vanes;
wherein the plurality of stator vanes are circumferentially spaced apart from one another and extend between the inner radial shroud and the outer radial shroud; and
wherein the inner radial shroud includes an attachment flange disposed at a first position axially forward of the plurality of stator vanes, and the outer radial shroud includes a plurality of lugs extending radially outward from the outer radial shroud at a second position axially forward of the plurality of stator vanes; and
wherein the annular stator vane stage further includes a flange extending radially outward from the outer radial shroud at an axial position that is central between a leading edge and a trailing edge of the plurality of stator vanes, wherein the flange includes an aft seal surface that extends radially and has a surface configuration that facilitates a sliding contact therebetween.

18. The annular stator vane stage of claim 17, wherein the annular stator vane stage is configured to be mounted at the attachment flange disposed at the first position axially forward of the plurality of stator vanes, and at the plurality of lugs disposed at the second position axially forward of the plurality of stator vanes, and cantilevered aft of the first position and the second position.

19. The annular stator vane stage of claim 18, wherein the annular stator vane stage is a unitary annular construct.

20. The annular stator vane stage of claim 18, wherein the annular inner radial shroud is configured as a first continuous ring, and the annular outer radial shroud is configured as a second continuous ring.

* * * * *